Patented Oct. 2, 1934

1,975,485

UNITED STATES PATENT OFFICE 1,975,485

PROCESS FOR MANUFACTURING PULVERULENT HYDRAULIC BINDING AGENTS CONTAINING BITUMINOUS COMPONENTS

Albert Sommer, Dresden, Germany, assignor to T. R. C. Corporation, Wilmington, Del., a corporation of Delaware No Drawing. Application January 14, 1933, Serial No. 651,845. In Germany January 5, 1933

5 Claims. (Cl. 106—24)

In order to reduce the dangers of shrinkage in cement construction as far as possible, the applicant has proposed the use of bitumen. This purpose has in general been accomplished, but the process allows of improvement in that the porosity of the mortar prepared with bitumenized cement can be reduced and thereby a greater stability gained. This purpose is served by the present invention.

It was found that in preparing mortar from the bitumenized hydraulic substances proposed and manufactured by the applicant more water was required than when using non-bitumenized cement. Of course, it is well known that the ultimate strength of the cement structure decreases proportionately or substantially so, within limits, with the increase of water. Thus, while the mortar prepared by the bituminous hydraulic substances possesses many advantages such as being less susceptible to shrinkage and expansion due to temperature variations, etc., nevertheless these advantages were obtained at the sacrifice of strength, and the resultant structure was weaker than a similar structure made of non-bituminous cement. When investigating the cause of this phenomenon it was found that the microscopic picture of bitumenized cement differed from that of normal cement even where the sieving results of the two products were identical. This is explained by the fact that as a part of the particles passing the finest sieve there are in a normal cement a great number of far smaller particles which can only be detected through a very powerful microscope. It is these minutest particles which are absent in bitumenized cement even where sieving tests revealed no difference, provided normal bitumen was used for treating the cement.

I have discovered that if the bitumen which is utilized to prepare the mortar from bituminous hydraulic substances is rendered and maintained more fluid by admixture with a proper medium of certain characteristics, at the time it is mixed with the pulverulent cement, the necessity for excess of water in the preparation of the mortar and the loss of strength incident thereto is eliminated, and the resulting structure is as strong, or stronger than a similar structure made of non-bituminous cement. To bring about this result I have found that alcohols of higher valence, such for example as glycerine are especially suitable for use with the bitumen. These alcohols moreover are hydroscopic and favor water absorption, so that their use obviates the excess of water heretofore required in preparing the mortar.

I have found, further, that the mortars or concrete bodies made from bituminous cement in accordance with the present invention are of approximately the same structure as similar mortars or structures made from non-bituminous cement, are substantially non-porous, have the same volume weight, attain the same strengths, but in addition thereto possess all of the advantageous and characteristic properties of bodies made from bituminous cement. Moreover, the addition of the alcohols of higher valence to the bitumen does not in any manner affect the sieving of the bituminous cement, and hence does not alter the grading thereof.

As an example, asphalt of penetration 200, and with a melting point of 30° C. is heated to about 160° and then mixed with 15 parts (by volume) of glycerine, the liquid being kept at a temperature of about 80 to 100°. This liquid is atomized through an injector by means of compressed air, this vapor being blown into a closed space. Simultaneously cement is blown into this space through spraying nozzles or the like, the two currents being advantageously directed parallel.

I claim:

1. The process of manufacturing pulverulent hydraulic binding agents containing bituminous components, which consists in adding an alcohol of higher valence to the bitumen prior to admixture with the pulverulent hydraulic binding agent.

2. The process of producing a pulverulent hydraulic binding agent which comprises treating pulverulent cement with a liquid solution of bitumen and an alcohol of higher valence.

3. The process of producing a pulverulent hydraulic binding agent which comprises treating pulverulent cement with a liquid solution of bitumen and a glycerine.

4. A pulverulent hydraulic binding agent consisting of pulverulent cement the particles of which are intimately mixed with bitumen, and an alcohol of higher valence.

5. A pulverulent hydraulic binding agent consisting of pulverulent cement the particles of which are intimately mixed with bitumen, and a glycerine.

ALBERT SOMMER.